D. W. MAURICE.
Churn Dasher.
No. 54,930.
Patented May 22, 1866.
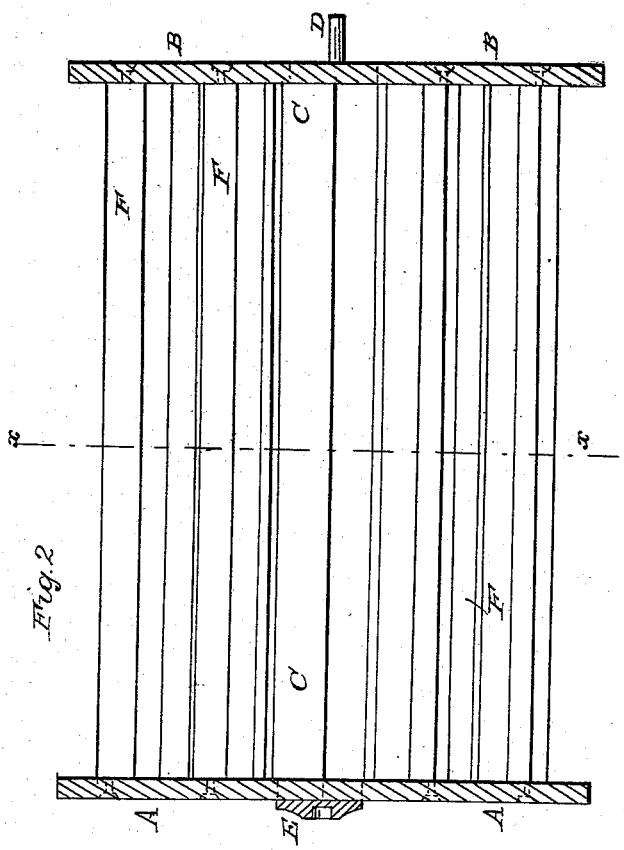
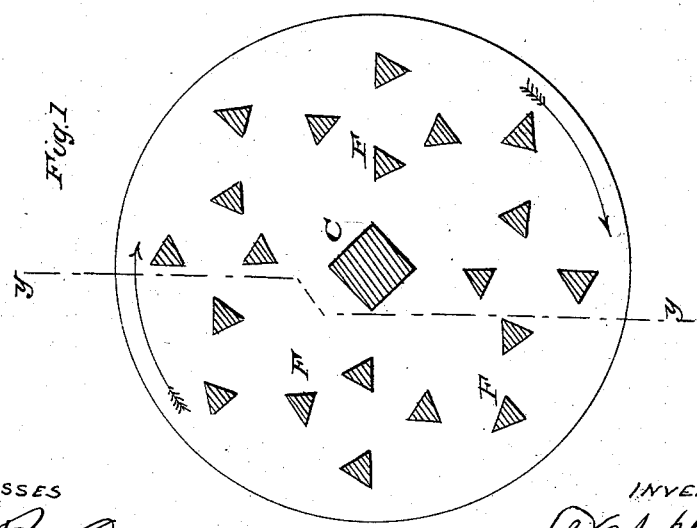

UNITED STATES PATENT OFFICE.

DAVID W. MAURICE, OF SPRINGFIELD, OHIO.

IMPROVEMENT IN CHURN-DASHERS.

Specification forming part of Letters Patent No. 54,930, dated May 22, 1866.

*To all whom it may concern:*

Be it known that I, DAVID W. MAURICE, of Springfield, in the county of Clarke and State of Ohio, have invented a new and useful Improvement in Churn-Dashers; and I do hereby declare that the following is a full, clear, and exact description thereof, which will enable others skilled in the art to make and use the same, reference being had to the accompanying drawings, forming a part of this specification, in which—

Figure 1 is a cross-section of my improved churn-dasher, taken through the line $x\,x$, Fig. 2. Fig. 2 is a longitudinal section of the same, taken through the line $y\,y$, Fig. 1.

Similar letters of reference indicate like parts.

My invention has for its object to furnish a churn-dasher that will do its work quickly and thoroughly, producing butter better in quality and greater in quantity than the ordinary dashers now in use; and it consists of a churn-dasher constructed and arranged as hereinafter more fully described.

A and B are disks securely attached to the ends of a shaft, C, and revolving with it. To the center of the disk B is attached a journal, D, upon which the dasher revolves. To the center of the disk A is attached a plate, E, having a socket formed therein, as shown, to receive the end of the crank-shaft or other device by which the dasher is operated, and which forms the other journal of the said shaft C.

F are slats extending from the disk A to the disk B. These slats are represented in the drawings as being arranged in three circles around the shaft C and at irregular distances from each other. They are also represented as being triangular in form, and so placed that the wedge-edge of the slats shall always point in the direction in which the slat is moving.

It is immaterial in what order the slats are placed with respect to each other, provided they are so arranged that the following slats may receive and break up the columns of cream set in motion by the preceding ones. These slats may be also made square, round, or of any other form; but I prefer to make them triangular, as first described. If made square, they should be so placed that an angle or edge of the slat may always point in the direction in which the slat is passing. As these slats are carried forward through the cream by the revolution of the shaft C the tendency is to form a vacuum at the rear of each advancing slat. This introduces the air into and distributes it through the cream, rendering the employment of a blower unnecessary.

This dasher may be revolved either vertically or horizontally, as may be desired, the position depending upon the form of the churn to which it is applied. The slats may also be attached radially to a revolving perpendicular or horizontal shaft, and the same effect be produced.

By means of this dasher the cream is so thoroughly broken up and the air so generally distributed through it that the time required for churning is very greatly diminished, the quantity of butter obtained is much increased, and the quality improved.

I claim as new and desire to secure by Letters Patent—

An improved churn-dasher constructed and arranged substantially as herein described, and for the purpose set forth.

D. W. MAURICE.

Witnesses:
 REUBEN MILLER,
 J. T. WARDER.